(12) United States Patent
Takahashi (10) Patent No.: US 7,976,605 B2
(45) Date of Patent: Jul. 12, 2011

(54) HONEYCOMB STRUCTURAL BODY AND MANUFACTURING METHOD THEREOF

(75) Inventor: Tomohisa Takahashi, Ibi-gun (JP)

(73) Assignee: Ibiden Co. Ltd., Ogaki-shi (JP)

( * ) Notice: Subject to any disclaimer, the term of this patent is extended or adjusted under 35 U.S.C. 154(b) by 0 days.

(21) Appl. No.: 12/872,102

(22) Filed: Aug. 31, 2010

(65) Prior Publication Data

US 2010/0319309 A1    Dec. 23, 2010

Related U.S. Application Data

(63) Continuation of application No. 11/092,902, filed on Mar. 30, 2005.

(30) Foreign Application Priority Data

| May 6, 2004 | (JP) | 2004-137728 |
| Dec. 24, 2004 | (WO) | PCT/JP2004/019382 |

(51) Int. Cl.
*B01D 39/00* (2006.01)
*B01D 39/14* (2006.01)
*B01D 39/06* (2006.01)

(52) U.S. Cl. ............. 55/523; 55/522; 55/524

(58) Field of Classification Search ......... 55/522–524
See application file for complete search history.

(56) References Cited

U.S. PATENT DOCUMENTS

| 4,177,307 A | 12/1979 | Torii et al. |
| 5,914,187 A * | 6/1999 | Naruse et al. ......... 428/327 |
| 5,930,994 A | 8/1999 | Shimato et al. |
| 6,447,564 B1 | 9/2002 | Ohno et al. |
| 6,565,630 B2 | 5/2003 | Ohno et al. |
| 6,669,751 B1 * | 12/2003 | Ohno et al. .......... 55/523 |
| 6,770,116 B2 | 8/2004 | Kojima |
| 6,939,825 B1 | 9/2005 | Ohno et al. |
| 7,112,233 B2 | 9/2006 | Ohno et al. |
| 7,119,046 B2 | 10/2006 | Ohno et al. |
| 7,196,037 B2 | 3/2007 | Ohno et al. |
| 7,234,296 B2 | 6/2007 | Kojima |
| 7,250,385 B1 | 7/2007 | Ohno et al. |
| 7,284,980 B2 | 10/2007 | Saijo et al. |
| 7,309,370 B2 | 12/2007 | Kudo et al. |
| 7,314,496 B2 | 1/2008 | Hong et al. |
| 7,316,722 B2 | 1/2008 | Komori et al. |

(Continued)

FOREIGN PATENT DOCUMENTS

EP    1 142 619 A1    10/2001

(Continued)

*Primary Examiner* — Walter D Griffin
*Assistant Examiner* — Amber Orlando
(74) *Attorney, Agent, or Firm* — Oblon, Spivak, McClelland, Maier & Neustadt, L.L.P.

(57) ABSTRACT

A honeycomb structural body including a ceramic block having a flat shape and comprising a plurality of honeycomb units, a sealing material layer bonding the honeycomb units and comprising a sealing material paste, and a peripheral sealing material layer formed on a peripheral portion of the ceramic block. The flat shape has a cross-section which is bisected by an axis, the sealing material layer forms an angle diagonal with respect to the axis of the flat shape, the sealing material layer has end portions abutting against the peripheral sealing layer at a diagonal angle, and each of the honeycomb units has through holes extending in a longitudinal direction of the ceramic block and a partition wall portion between the through holes.

23 Claims, 6 Drawing Sheets

U.S. PATENT DOCUMENTS

| | | |
|---|---|---|
| 7,326,270 B2 | 2/2008 | Hong et al. |
| 7,332,014 B2 | 2/2008 | Ono et al. |
| 7,341,614 B2 | 3/2008 | Hayashi et al. |
| 7,348,049 B2 | 3/2008 | Yoshida |
| 7,387,657 B2 | 6/2008 | Kunieda et al. |
| 7,387,829 B2 | 6/2008 | Ohno et al. |
| 7,393,376 B2 | 7/2008 | Taoka et al. |
| 7,396,586 B2 | 7/2008 | Ohno et al. |
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,510,588 B2 | 3/2009 | Kudo |
| 7,517,502 B2 | 4/2009 | Ohno et al. |
| 7,520,178 B2 | 4/2009 | Ohno et al. |
| 7,524,350 B2 | 4/2009 | Kunieda |
| 7,534,482 B2 | 5/2009 | Yoshida |
| 7,540,898 B2 | 6/2009 | Oshimi |
| 7,543,513 B2 | 6/2009 | Kobayashi et al. |
| 7,550,026 B2 | 6/2009 | Hayakawa |
| 7,550,119 B2 | 6/2009 | Kojima |
| 7,556,666 B2 | 7/2009 | Kunieda |
| 7,585,471 B2 | 9/2009 | Oshimi |
| 7,588,716 B2 | 9/2009 | Iwata |
| 7,603,793 B2 | 10/2009 | Hoshino et al. |
| 7,611,764 B2 | 11/2009 | Komori et al. |
| 7,625,529 B2 | 12/2009 | Ohno et al. |
| 7,632,452 B2 | 12/2009 | Saijo et al. |
| 7,641,956 B2 | 1/2010 | Yoshida |
| 7,648,547 B2 | 1/2010 | Ohno |
| 7,651,754 B2 | 1/2010 | Kunieda |
| 7,651,755 B2 | 1/2010 | Yoshida |
| 7,662,458 B2 | 2/2010 | Ninomiya et al. |
| 7,687,013 B2 | 3/2010 | Kawai et al. |
| 7,695,655 B2 | 4/2010 | Yamamura et al. |
| 7,695,671 B2 | 4/2010 | Yamamura et al. |
| 7,704,295 B2 | 4/2010 | Oshimi |
| 7,708,933 B2 | 5/2010 | Kasai et al. |
| 7,713,325 B2 | 5/2010 | Shibata |
| 7,727,451 B2 | 6/2010 | Naruse et al. |
| 7,731,774 B2 | 6/2010 | Ohno et al. |
| 7,732,366 B2 | 6/2010 | Ohno et al. |
| 7,779,767 B2 | 8/2010 | Saijo et al. |
| 7,803,312 B2 | 9/2010 | Ohno et al. |
| 7,811,351 B2 | 10/2010 | Oshimi |
| 7,824,629 B2 | 11/2010 | Oshimi et al. |
| 2002/0038536 A1 | 4/2002 | Best et al. |
| 2004/0045267 A1 | 3/2004 | Ichikawa et al. |
| 2004/0055265 A1 | 3/2004 | Ohno et al. |
| 2004/0093858 A1 | 5/2004 | Aoki |
| 2004/0161596 A1 | 8/2004 | Taoka et al. |
| 2004/0206044 A1 | 10/2004 | Kondo et al. |
| 2005/0011174 A1* | 1/2005 | Hong et al. ............. 55/523 |
| 2005/0076626 A1 | 4/2005 | Kudo et al. |
| 2005/0095179 A1 | 5/2005 | Kasai et al. |
| 2005/0109023 A1 | 5/2005 | Kudo et al. |
| 2005/0115224 A1 | 6/2005 | Kojima |
| 2005/0153099 A1 | 7/2005 | Yamada |
| 2005/0169818 A1 | 8/2005 | Ohno et al. |
| 2005/0169819 A1 | 8/2005 | Shibata |
| 2005/0180898 A1 | 8/2005 | Yamada |
| 2005/0272602 A1 | 12/2005 | Ninomiya |
| 2006/0032203 A1 | 2/2006 | Komori et al. |
| 2006/0043652 A1 | 3/2006 | Saijo et al. |
| 2006/0051556 A1 | 3/2006 | Ohno et al. |
| 2006/0059877 A1 | 3/2006 | Yoshida |
| 2006/0073970 A1 | 4/2006 | Yamada |
| 2006/0093784 A1 | 5/2006 | Komori et al. |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216467 A1 | 9/2006 | Yoshida |
| 2006/0222812 A1 | 10/2006 | Koyama et al. |
| 2006/0269722 A1 | 11/2006 | Yamada |
| 2007/0020155 A1 | 1/2007 | Ohno et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi et al. |
| 2007/0187651 A1 | 8/2007 | Naruse et al. |
| 2007/0199643 A1 | 8/2007 | Kawai et al. |
| 2007/0212517 A1 | 9/2007 | Ohno et al. |
| 2007/0243283 A1 | 10/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0150200 A1 | 6/2008 | Tajima |
| 2008/0160249 A1 | 7/2008 | Makino |
| 2008/0197544 A1 | 8/2008 | Saijo et al. |
| 2008/0211127 A1 | 9/2008 | Naruse et al. |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |
| 2009/0199953 A1 | 8/2009 | Sato |
| 2009/0202402 A1 | 8/2009 | Sato |
| 2009/0220735 A1 | 9/2009 | Mizuno et al. |
| 2009/0238732 A1 | 9/2009 | Ohno |
| 2009/0242100 A1 | 10/2009 | Saijo |
| 2009/0243165 A1 | 10/2009 | Hiroshima |
| 2009/0252906 A1 | 10/2009 | Higuchi |

FOREIGN PATENT DOCUMENTS

| | | |
|---|---|---|
| EP | 1 371 406 A1 | 12/2003 |
| EP | 1 479 881 A1 | 11/2004 |
| EP | 1 479 882 A1 | 11/2004 |
| EP | 1 486 242 A1 | 12/2004 |
| EP | 1 489 274 A1 | 12/2004 |
| EP | 1 508 402 A1 | 2/2005 |
| EP | 1 618 941 A1 | 1/2006 |
| JP | 2000-102709 | 4/2000 |
| JP | 2001-96116 | 4/2001 |
| JP | 2002-028644 | 2/2002 |
| JP | 2002-273130 | 9/2002 |
| JP | 2003-181233 | 7/2003 |
| JP | 2003-260332 | 9/2003 |
| JP | 2003-291054 | 10/2003 |
| WO | WO 03-067042 | 8/2003 |
| WO | WO 03-078026 | 9/2003 |
| WO | WO 03-084640 | 10/2003 |
| WO | WO 2004-031101 | 4/2004 |
| WO | WO 2004-096414 A1 | 11/2004 |

* cited by examiner

A-A Line cross-sectional view

A-A Line cross-sectional view

Fig. 8

HONEYCOMB STRUCTURAL BODY AND MANUFACTURING METHOD THEREOF

CROSS-REFERENCE TO RELATED APPLICATIONS

This application is a continuation of and claims benefit of priority from U.S. application Ser. No. 11/092,902, filed Mar. 30, 2005, which claims benefit of priority to Japanese Patent Application No. 2004-137728, filed May 6, 2004, and PCT application PCT/JP2004/019382, filed Dec. 24, 2004. The contents of those applications are incorporated herein by reference in their entirety.

BACKGROUND OF THE INVENTION

1. Field of the Invention

The present invention relates to a honeycomb structural body that is used as a filter for removing particulates and the like contained in exhaust gases discharged from an internal combustion system such as a diesel engine or the like, a catalyst supporting member and the like.

2. Discussion of the Background

In recent years, particulates, such as soot and the like, contained in exhaust gases that are discharged from internal combustion engines of vehicles, such as buses, trucks and the like, and construction machines and the like, have raised serious problems as those particulates are harmful to the environment and the human body.

In order to solve these problems, various honeycomb structural bodies made of porous ceramics, which serve as filters capable of collecting particulates in exhaust gases to purify the exhaust gases, have been proposed.

Conventionally, with respect to the honeycomb structural body of this type, a honeycomb structural body comprising: a ceramic block in which a plurality of honeycomb units are bonded to each other through a sealing material layer, said honeycomb unit is mainly composed of porous ceramic and includes a large number of through holes placed in parallel with one another in a longitudinal direction with a partition wall interposed therebetween; and a sealing material layer formed on a peripheral portion thereof, has been known.

With respect to these honeycomb structural bodies, most of them have a circular shape on the cross section perpendicular to the longitudinal direction; however, in recent years, honeycomb structural bodies having various shapes on the cross section perpendicular to the longitudinal direction, such as an elongated round shape (race-track shape), an elliptical shape, an approximately triangular shape, an approximately trapezoidal shape and the like, have been proposed (for example, see Japanese Patent Laid-Open Publication No. 2002-273130, Japanese Patent Laid-Open Publication No. 2003-260322, International Laid-Open Publication No. 03/078026A1, and Japanese Patent Laid-Open Publication No. 2003-181233).

Figure 1A:
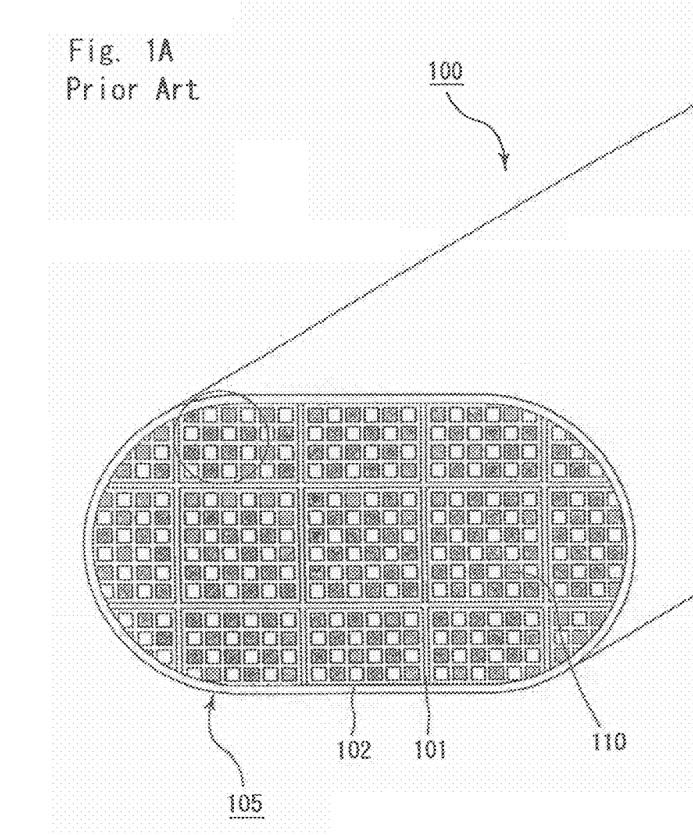
FIG. 1A is a perspective view that schematically shows a conventional honeycomb structural body.
Figure 1B:
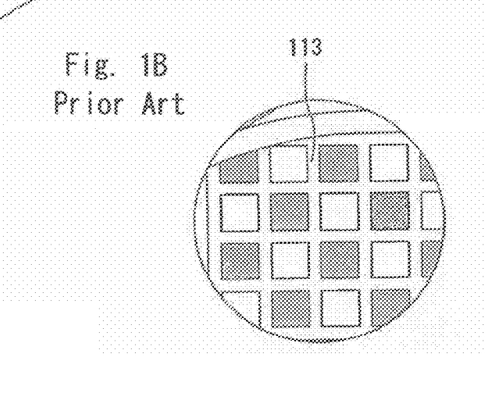
FIG. 1B is a partially enlarged perspective view that shows one portion of the honeycomb structural body shown in FIG. 1A in an enlarged manner.

FIG. 1A is a perspective view that schematically shows a honeycomb filter formed by such a honeycomb structural body, and FIG. 1B is a partially enlarged perspective view that shows one portion thereof. Moreover, FIG. 2A is a perspective view that schematically shows one example of a honeycomb unit that forms the honeycomb filter shown in FIGS. 1A and 1B, and FIG. 2B is a cross-sectional view taken along line A-A of FIG. 2A.

As shown in FIG. 1A, a honeycomb filter 100 has a structure in which a plurality of honeycomb units 110 made of silicon carbide or the like are combined with one another to form a ceramic block 105 through a sealing material layer (an adhesive layer) 101, with a sealing material layer (a coat layer) 102 being formed on the periphery of this ceramic block 105. The end face of this honeycomb filter 100 has an elongated round shape, and the pattern of the sealing material layer (the adhesive layer) among the honeycomb units on the cross-section perpendicular to the longitudinal direction is designed so as to be approximately perpendicular to the major axis of the shape forming the contour of the cross section.

Figure 2A:
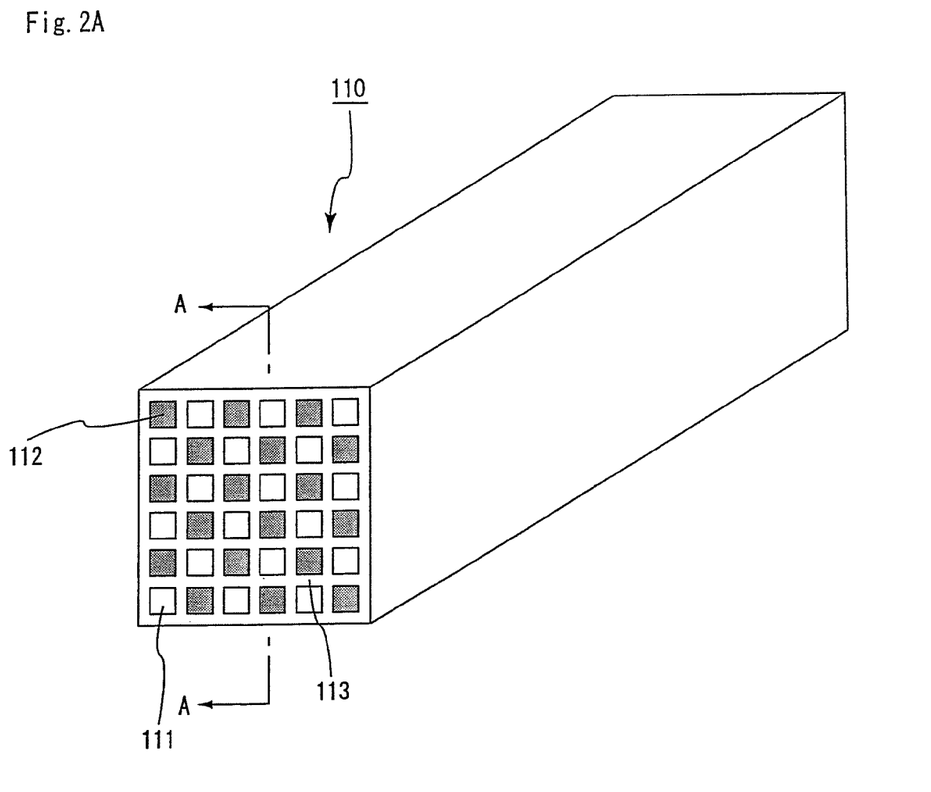
FIG. 2A is a perspective view that schematically shows one example of a honeycomb unit that constitutes a conventional honeycomb structural body.
Figure 2B:
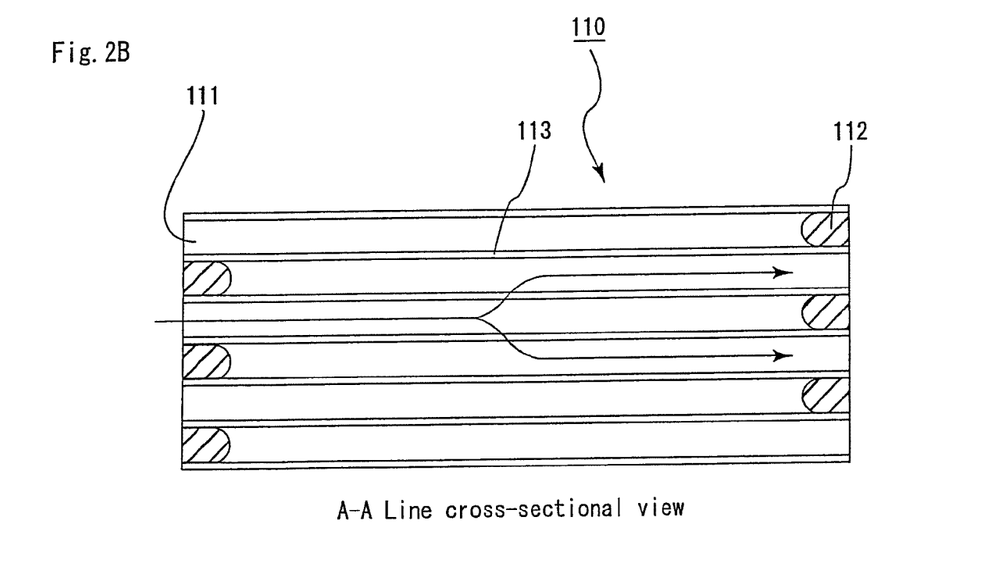
FIG. 2B is a cross-sectional view taken along line A-A of the honeycomb unit shown in FIG. 2A.

As shown in FIGS. 2A and 2B, in the honeycomb unit 110, a number of through holes 111 are placed in parallel with one another in the longitudinal direction so that the partition wall 113 that separates the through holes 111 from each other is allowed to function as a filter. In other words, as shown in FIG. 2B, each of the through holes 111 formed in the honeycomb unit 110 is sealed with a plug 112 at either of ends of its exhaust gas inlet side and outlet side so that exhaust gases that have entered one through hole 111 are discharged from another through hole 111 after having always passed through the partition wall 113 that separates the corresponding through holes 111.

Upon manufacturing such a honeycomb structural body having an elliptical shape on its cross section perpendicular to the longitudinal direction, first, after having manufactured honeycomb units each of which is made of porous ceramics with its end face being sealed so as to form a checked pattern as shown in FIGS. 2A and 2B, these pluralities of honeycomb units are bonded to one another through sealing material, and dried to form a honeycomb unit aggregated body.

Next, this honeycomb unit aggregated body is subjected to a cutting process such that the cross section perpendicular to the longitudinal direction is formed into an elongated round shape, and at this time, the cutting process is carried out so that in the elongated round shape, the pattern of the sealing material layer (the adhesive layer) among the honeycomb units on the cross section is designed so as to be approximately perpendicular to the major axis of the shape forming the contour of the cross section, and a sealing material layer (a coat layer) is lastly formed on the periphery thereof, and dried; thus, the manufacturing process of the honeycomb filter is completed.

The above-mentioned document has described that the honeycomb structural body having such a shape exerts such effects that it can suppress a reduction in resistance against canning (canning strength).

In the honeycomb filter shown in FIGS. 1A and 1B, however, in the cross section perpendicular to the longitudinal direction, the sealing material layer (the adhesive layer) is formed with an approximately right angle with respect to the major axis of the elliptical shape forming the contour of the cross section, and the sealing material layer (the adhesive layer) formed with the right angle with respect to the major axis is comparatively short. Such a short length of the sealing material layer may cause a problem.

The contents of Japanese Patent Laid-Open Publication No. 2002-273130, Japanese Patent Laid-Open Publication No. 2003-260322, International Laid-Open Publication No. 03/078026A1, and Japanese Patent Laid-Open Publication No. 2003-181233 are incorporated herein by reference in their entirety.

SUMMARY OF THE INVENTION

The honeycomb structural body of the present invention is a honeycomb structural body comprising:

a ceramic block having a flat shape in which a plurality of honeycomb units are bonded to each other through a sealing material layer, said honeycomb unit mainly comprises porous ceramic and includes a large number of through holes placed in parallel with one another in a longitudinal direction with a partition wall interposed therebetween; and a sealing material layer formed on a peripheral portion thereof, wherein the sealing material layer among the honeycomb units on a cross section perpendicular to the longitudinal direction has a pattern that is formed in a diagonal direction with respect to a major axis of a shape forming a contour of the cross section.

In the present invention, a cross-sectional area perpendicular to the longitudinal direction of a honeycomb unit constituting the honeycomb structural body is desirably set to about 25 cm$^2$ or less. Further, the cross-sectional area is desirably set to about 1 cm$^2$ or more. The honeycomb unit desirably has a race-track shape or an elliptical shape on the cross section perpendicular to the longitudinal direction. The angle, formed by the pattern of the sealing material layer among the honeycomb units on the cross section perpendicular to the longitudinal direction and the major axis of the shape forming the contour of the cross section, is desirably set in the range of at least about 5° and at most about 85°. The angle is more desirably set in the range of about 15° to 75°, and even more desirably set in the range of about 30° to 60°.

The thickness of the sealing material layer on the peripheral portion is desirably at least about 0.1 mm and at most about 10 mm, and more desirably in the range of about 0.1 to 4 mm. The thickness of the sealing material layer to adhere the honeycomb units is desirably at least about 0.1 mm and at most about 10 mm, and more desirably in the range of about 0.2 to 3 mm.

It is desirable that the sealing material layer comprises an inorganic binder, an organic binder and an inorganic fiber and/or an inorganic particle.

The honeycomb unit constituting the honeycomb structural body of the present invention desirably comprises at least one member selected from the group consisting of nitride ceramics, carbide ceramics, and oxide ceramics. The honeycomb unit more desirably comprises a silicon carbide-natured ceramic.

Further, it is desirable that a catalyst is supported on the honeycomb structural body, and each of the through holes is sealed on either one of the ends.

The manufacturing method for a honeycomb structural body of the present invention is a method for manufacturing a honeycomb structural body having a flat shape, comprising the steps of:

the honeycomb unit bonding process of bonding a plurality of honeycomb units, each of which mainly comprises porous ceramics and includes a large number of through holes placed in parallel with one another in the longitudinal direction with a partition wall interposed therebetween, to one another through a sealing material layer and drying the honeycomb units; and the ceramic block manufacturing process of carrying out a cutting process on a honeycomb unit aggregated body in which a plurality of honeycomb units are bonded to each other through a sealing material layer in a manner that the pattern of the sealing material layer among the honeycomb units on a cross section perpendicular to the longitudinal direction is formed in a diagonal direction with respect to a major axis of a shape forming a contour of the cross section so as to obtain a ceramic block having a flat shape.

Regarding the manufacturing method for a honeycomb structural body of the present invention, the honeycomb unit desirably comprises at least one member selected from the group consisting of nitride ceramics, carbide ceramics, and oxide ceramics. The honeycomb unit more desirably comprises a silicon carbide-natured ceramic.

Further, regarding the honeycomb unit bonding process, it is desirable that a plurality of honeycomb units are bonded to one another through the sealing material layer so that the thickness of the sealing material layer after drying is at least about 0.1 mm and at most about 10 mm. It is more desirable that the thickness of the sealing material layer after drying is in the range of about 0.2 to 3 mm.

Further, regarding the ceramic block manufacturing process, it is desirable that a diamond cutter is used in the cutting process.

DESCRIPTION OF THE EMBODIMENTS

The honeycomb structural body of the present invention is a honeycomb structural body comprising:

a ceramic block having a flat shape in which a plurality of honeycomb units are bonded to each other through a sealing material layer, said honeycomb unit mainly comprises porous ceramic and includes a large number of through holes placed in parallel with one another in a longitudinal direction with a partition wall interposed therebetween; and a sealing material layer formed on a peripheral portion thereof, wherein the sealing material layer among the honeycomb units on a cross section perpendicular to the longitudinal direction has a pattern that is formed in a diagonal direction with respect to a major axis of a shape forming a contour of the cross section.

Figures 3A, 3B:
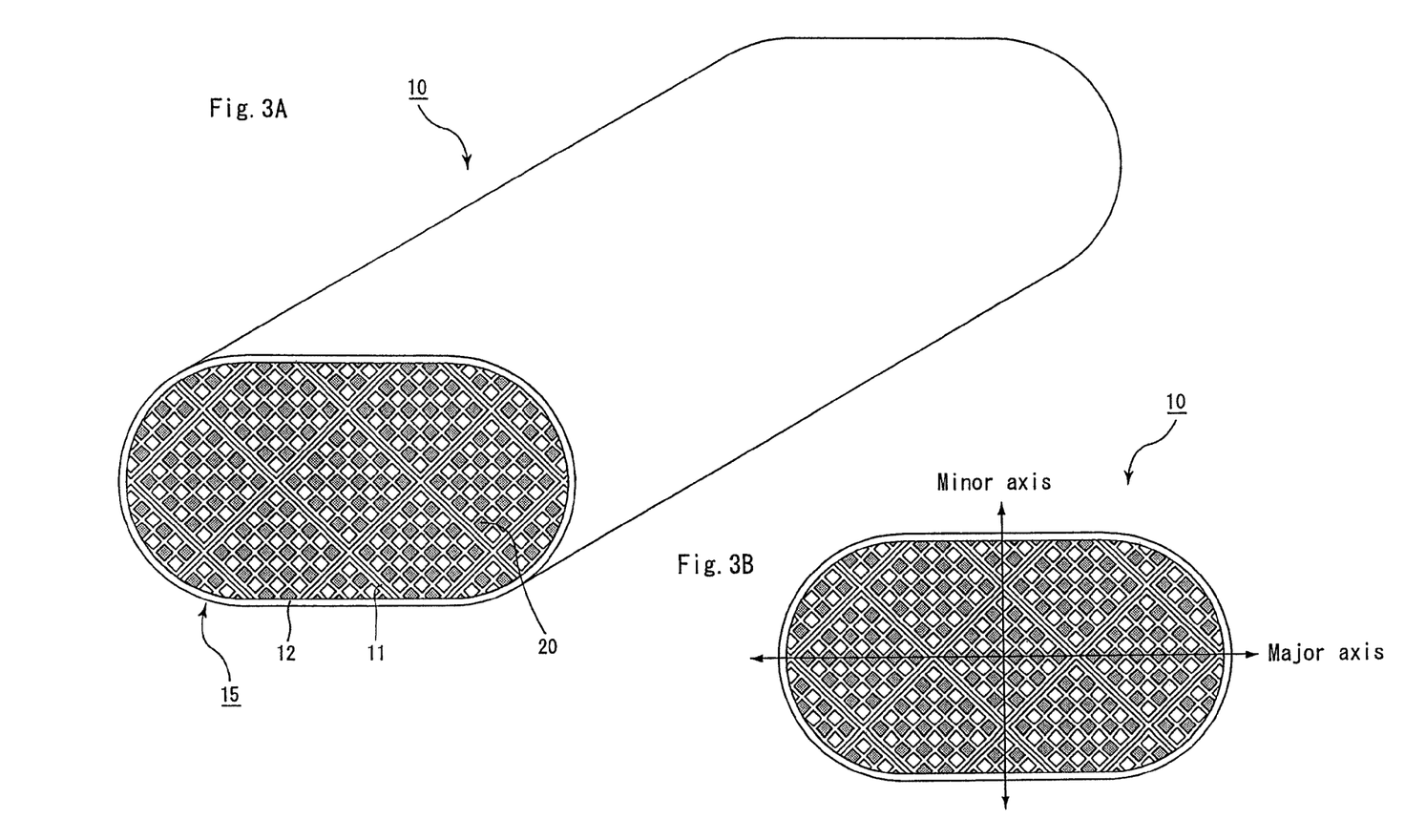
FIG. 3A is a perspective view that schematically shows one example of a honeycomb structural body of the present invention.
FIG. 3B is a drawing that shows the major axis and the minor axis of the honeycomb structural body shown in FIG. 3A.
Figure 4A:
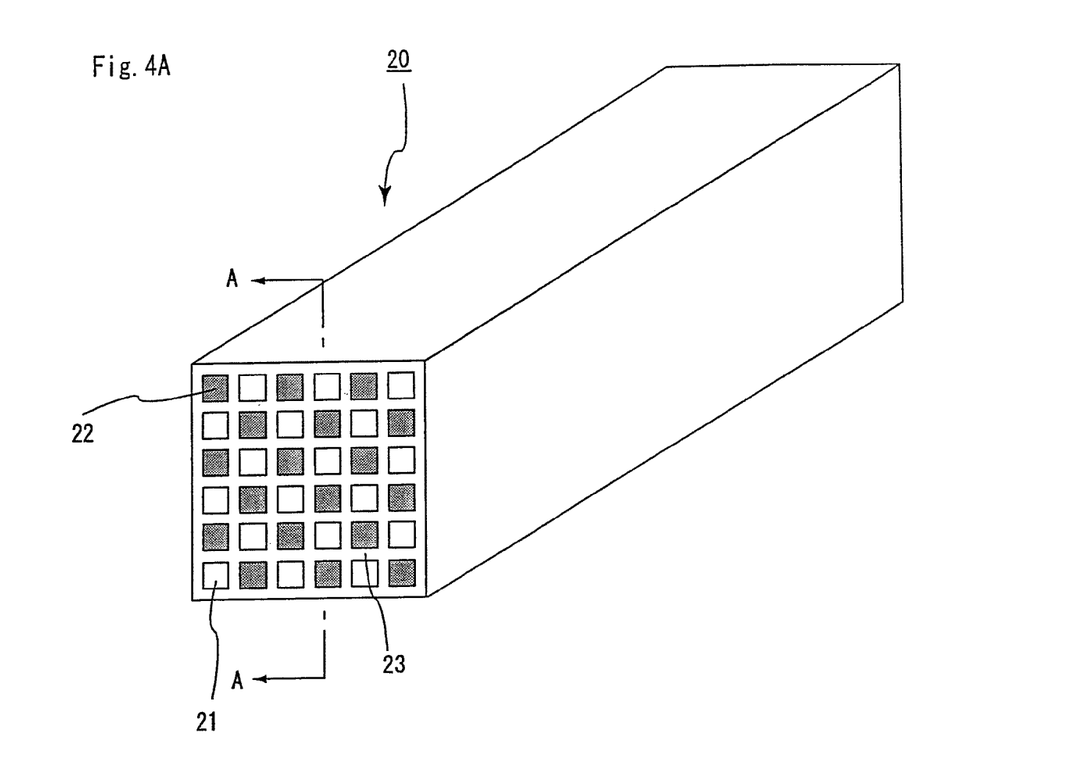
FIG. 4A is a perspective view that schematically shows one example of a honeycomb unit that forms the honeycomb structural body of the present invention.

FIG. 3A is a perspective view that schematically shows one example of a honeycomb structural body of the present invention, and FIG. 3B is shows the major axis and the minor axis of the honeycomb structural body shown in FIG. 3A. FIG. 4A is a perspective view that schematically shows one example of a honeycomb unit that forms the honeycomb structural body of the present invention, and FIG. 4B is a cross-sectional view taken along line A-A of the honeycomb unit shown in FIG. 4A.

As shown in FIG. 3A, a honeycomb structural body 10 has a structure in which a plurality of honeycomb units 20 comprising silicon carbide and the like are combined with one another through a sealing material layer (adhesive layer) 11 to form a ceramic block 15, and a sealing material layer (coat layer) 12 is formed on the periphery of the ceramic block 15. The end face of this honeycomb filter 10 has an elongated round shape (race-track shape), and the pattern of the sealing material layer among the honeycomb units on a cross section perpendicular to the longitudinal direction is formed in a diagonal direction with respect to the major axis of the shape forming the contour of the cross section.

Figure 4B:
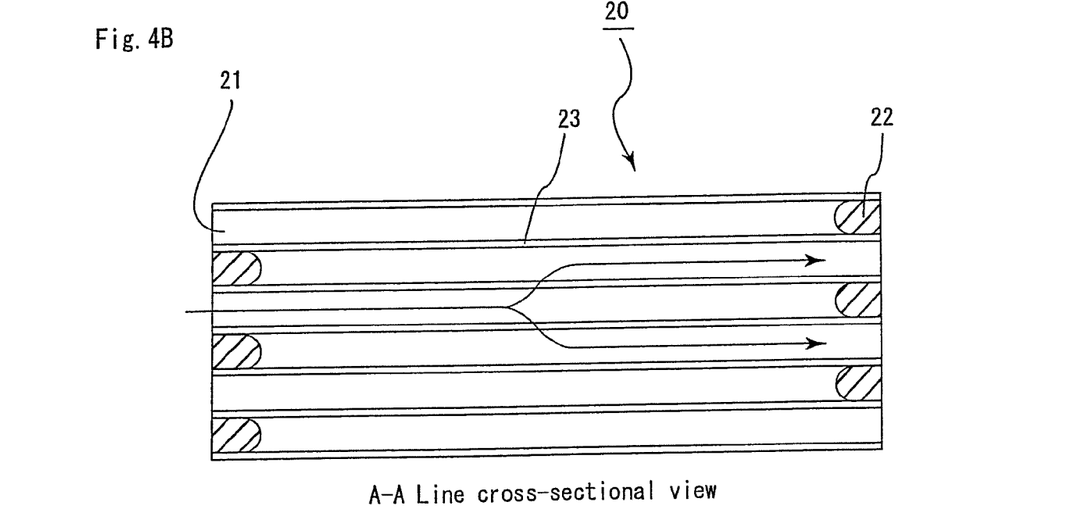
FIG. 4B is a cross-sectional view taken along line A-A of the honeycomb unit shown in FIG. 4A.

As shown in FIGS. 4A and 4B, in the honeycomb unit 20, a number of through holes 21 are placed in parallel with one another in the longitudinal direction so that the partition wall 23 that separates the through holes 21 from each other is allowed to function as a filter. In other words, as shown in FIG. 4B, each of the through holes 21 formed in the honeycomb unit 20 is sealed with a plug 22 at either of ends of its exhaust gas inlet side and outlet side so that exhaust gases that enter one through hole 21 are always discharged from another through hole 21 after they pass through the partition wall 23 that separates the corresponding through holes 21.

According to the present invention, since the pattern of the sealing material layer (adhesive layer) 11 among the honeycomb units 20 on a cross section perpendicular to the longitudinal direction is formed in a diagonal direction with respect to the major axis of the shape (elongated round shape) forming the contour of the cross section, the angles, formed by the sealing material layer (adhesive layer) 11 among honeycomb units 20 and the sealing material layer (coat layer) 12 on a cross section perpendicular to the longitudinal direction, are diagonal in many portions.

In the case where the pattern of the sealing material layer among honeycomb units on a cross section perpendicular to the longitudinal direction is made perpendicular to the major axis in the shape forming the contour of the cross section in the same manner as the conventional structure, the angles, formed by the sealing material layer (adhesive layer) 101 and the sealing material layer (coat layer) 102, are approximately perpendicular in many portions, and the area at which the two members contact with each other is small.

Since the sealing material (adhesive material and coating material) and the honeycomb unit have different coefficients of thermal expansion and the like, a stress is generated between the sealing material layer (adhesive layer) 101 and the sealing material layer (coat layer) 102 at increased temperatures due to the difference in coefficients of thermal expansion. The stress is exerted perpendicularly to the sealing material layer (coat layer) 102, and since the contact area between the two members is small, the stress is further increased, so that the sealing material layer (coat layer) 102 becomes more likely to be damaged (see FIGS. 1A and 1B).

In contrast, in the present invention, the pattern of the sealing material layer (adhesive layer) 11 among the honeycomb units 20 on a cross section perpendicular to the longitudinal direction is formed in a diagonal direction with respect to the sealing material layer (coat layer) 12 at many portions, and the contact area between the sealing material layer (adhesive layer) 11 and the sealing material layer (coat layer) 12 is large. Therefore, the force which is exerted perpendicularly to the sealing material layer (coat layer) 12 becomes smaller, making it possible to prevent occurrence of damage in the sealing material layer (coat layer) 12.

Moreover, since the pattern of the sealing material layer (adhesive layer) 11 among the honeycomb units 20 on a cross section perpendicular to the longitudinal direction is formed in a diagonal direction with respect to the major axis of the shape forming the contour of the cross section, the angles, formed by the major axis and the partition wall 23 constituting the honeycomb units 20, are also set diagonally. Upon cutting the partition wall 23, it is possible to prevent the partition wall 23 from being cut too thinly. Consequently, a partition wall has a great resistance to physical impact, and a honeycomb structural body that has a great durability is obtained.

In other words, according to the present invention, since it is unlikely that a stress concentrates at a portion between the sealing material layer as an inner adhesive layer located closely to the minor axis and the sealing material layer as a peripheral coat layer, the sealing material layers are resistant to damage in the course of temperature increase. Accordingly, the sealing material layers can maintain the bonding strength. Further, since it is unlikely that the partition wall has a thin portion, the partition wall has a great resistance to physical impact and provides a honeycomb structural body that is excellent in durability.

In the present invention, the angle, formed by the pattern of the sealing material layer (adhesive layer) 11 among the honeycomb units on a cross section perpendicular to the longitudinal direction and the major axis of the peripheral pattern, desirably has a minimum value of about 5°, more desirably about 15°, even more desirably about 30°. Moreover, the angle, formed with the major axis of the peripheral pattern, desirably has a maximum value of about 85°, more desirably about 75°, even more desirably about 60°.

When the angle, formed by the pattern of the sealing material layer (adhesive layer) 11 among the honeycomb units 20 on a cross section perpendicular to the longitudinal direction and the major axis of the peripheral pattern, is less than about 5° or exceeds about 85°, there is approximately no difference compared with the case where the pattern is perpendicular. It is more likely that the sealing material layer is damaged due to thermal impact and the like, and, in some portions, thinner partition wall is formed and the strength of the corresponding portions is reduced.

In the present invention, the cross-sectional area perpendicular to the longitudinal direction of a honeycomb unit constituting the honeycomb structural body is desirably set to about 25 cm$^2$ or less. Moreover, the cross-sectional area is desirably set to about 1 cm$^2$ or more.

In the case where the cross-sectional area perpendicular to the longitudinal direction of a honeycomb unit constituting the honeycomb structural body is about 25 cm$^2$ or less, the temperature difference between the center portion and the peripheral portion does not become too large even in the course of temperature increase since the cross-sectional area is small. Therefore, the thermal stress does not become too large, and allows the honeycomb unit to have a high resistance to thermal impact.

The honeycomb structural body of the present invention mainly comprises a porous ceramic material. Examples of the material include: nitride ceramics such as aluminum nitride, silicon nitride, boron nitride, and titanium nitride; carbide ceramics such as silicon carbide, zirconium carbide, titanium carbide, tantalum carbide, and tungsten carbide; oxide ceramics such as alumina, zirconia, cordierite, mullite, and silica; and the like. Moreover, the honeycomb structural body 10 may comprise a composite material of silicon and silicon carbide, or may comprise two or more kinds of materials such as aluminum titanate.

With respect to the material for the porous ceramics, a silicon carbide-natured ceramic, which has high heat resistance, excellent mechanical properties and high thermal conductivity, is desirably used. Here, the silicon carbide-natured ceramic is defined as such a material containing about 60% by weight or more of silicon carbide.

With respect to the particle size of the ceramic material to be used upon manufacturing the honeycomb structural body 10, although not particularly limited, those materials that show a little shrinkage in the succeeding firing process are desirably used. For example, those materials, prepared by mixing 100 parts by weight of powders having an average particle size in the range of about 0.3 to 50 μm and about 5 to 65 parts by weight of powders having an average particle size in the range of about 0.1 to 1.0 μm, are desirably used. By mixing ceramic powders having the above-mentioned particle sizes at the above-mentioned blending ratios, an integral honeycomb structural body comprising porous ceramics is manufactured.

Incidentally, the plug 22 and the partition wall 23 constituting the honeycomb unit 20 desirably comprise the same porous ceramic material. This arrangement makes it possible to increase the bonding strength between the two members, and by adjusting the porosity of the plug 22 in the same manner as that of the partition wall 23, it is possible to take the matching of the coefficient of thermal expansion of the partition wall 23 and the coefficient of thermal expansion of the plug 22. Accordingly, it becomes possible to prevent the occurrence of a gap between the plug 22 and the partition wall 23 and the generation of a crack in the plug 22 or in the portion of the partition wall 23 which contacts the plug 22, which are caused by a thermal stress that is exerted upon production as well as upon use.

In addition to the above-mentioned ceramics, the plug 22 may contain metal and the like in order to adjust the thermal capacity thereof.

With respect to the metal, examples thereof are not particularly limited, and may include iron, aluminum, metal silicon (Si) and the like. Each of these may be used alone, or two or more kinds of these may be used in combination.

The thickness of the plug 22 is not particularly limited. However, in the case where the plug 22 comprises porous silicon carbide, the thickness thereof is desirably set in the range of about 1 to 40 mm, more desirably about 3 to 20 mm.

The thickness of the partition wall 23 is not particularly limited. However, the lower limit value is desirably set to about 0.1 mm, and the upper limit value is desirably set to about 1.2 mm. If the thickness is less than about 0.1 mm, the honeycomb structural body 10 may have insufficient strength. If the thickness exceeds about 1.2 mm, it becomes difficult to heat the portions of the partition wall 23 which contact with the plug 22 for sealing the group of inlet-side through holes 21a. Thus, cracks may be generated due to a thermal stress in the vicinity of the interface between the plug 22 and the partition wall 23.

In the honeycomb structural body 10 of the present invention, the sealing material layer (adhesive layer) 11, which is formed among the honeycomb units 20, serves as an adhesive that bonds a plurality of honeycomb units 20 to one another. The sealing material layer (coat layer) 12, on the other hand, which is formed on the peripheral face of the ceramic block 15, serves as a sealing material that prevents exhaust gases which flows through the through holes from leaking from the peripheral face of the ceramic block 15, when the honeycomb structural body 10 is placed in an exhaust passage in an internal combustion engine.

Incidentally, in the honeycomb unit 10, the sealing material layer (adhesive layer) 11 and the sealing material layer (coat layer) 12 may comprise the same material, or may comprise different materials. In the case where the sealing material layer (adhesive layer) 11 and the sealing material layer (coat layer) 12 comprise the same materials, the blending ratio of the materials may be the same or different from each other.

The sealing material layer (adhesive layer) 11 may comprise a dense material or may comprise a porous material so as to allow exhaust gases to flow therein. However, the sealing material layer (coat layer) 12 desirably comprises a dense material. This is because the sealing material layer (coat layer) 12 is formed so as to prevent leak of exhaust gases from the peripheral face of the ceramic block 15 when the honeycomb unit 10 is placed in an exhaust passage of an internal combustion engine.

The minimum value of the thickness of the sealing material layer (adhesive layer) 11 is desirably set to about 0.1 mm, and more desirably about 0.2 mm. Moreover, the maximum value of the thickness of the sealing material layer (adhesive layer) 11 is desirably set to about 10 mm, and more desirably about 3 mm.

The minimum value of the thickness of the sealing material layer (coat layer) 12 is desirably set to about 0.1 mm. Moreover, the maximum value of the thickness of the sealing material layer (coat layer) 12 is desirably set to about 10 mm, and more desirably about 4 mm.

With respect to the material constituting the sealing material layer (adhesive layer) 11 and the sealing material layer (coat layer) 12, examples thereof are not particularly limited, and may include a material comprising an inorganic binder, an organic binder and an inorganic fiber and/or an inorganic particle.

With respect to the inorganic binder, examples thereof include silica sol, alumina sol and the like. Each of these may be used alone or two or more kinds of these may be used in combination. Among the above inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the above organic binders, carboxymethyl cellulose is more desirably used.

With respect to the inorganic fiber, examples thereof include ceramic fibers such as silica-alumina, mullite, alumina, and silica, and the like. Each of these may be used alone or two or more kinds of these may be used in combination. Among the above inorganic fibers, alumina fibers and silica-alumina fibers are more desirably used. With respect to the fiber length of the inorganic fibers, the lower limit thereof is desirably set to about 5 μm. The upper limit of the fiber length of the inorganic fibers is desirably set to about 100 mm, and more desirably about 100 μm. If the fiber length is less than about 5 μm, the elasticity of the sealing material layer may fail to improve. If the fiber length exceeds about 100 mm, on the other hand, pill-state inorganic fibers tend to be generated, and may degrade dispersion in the inorganic particles. Moreover, if the fiber length exceeds about 100 μm, it sometimes becomes difficult to make the sealing material layer thinner.

With respect to the inorganic particle, examples thereof include carbides, nitrides and the like, and specific examples include inorganic powder, whiskers and the like comprising silicon carbide, silicon nitride, boron nitride and the like. Each of these may be used alone, or two or more kinds of these may be used in combination. Among the above inorganic particles, silicon carbide having an excellent thermal conductivity is desirably used.

Moreover, a pore-forming agent, such as balloons that are fine hollow spheres comprising oxide-based ceramics, spherical acrylic particles, and graphite, may be added to the above-mentioned sealing material paste, if necessary.

With respect to the above-mentioned balloons, examples thereof are not particularly limited, and may include alumina balloons, glass micro-balloons, shirasu balloons, fly ash balloons (FA balloons), mullite balloons and the like. Among these, alumina balloons are more desirably used.

Although the porosity of the honeycomb structural body 10 is not particularly limited, the lower limit thereof is desirably set to about 20%, and the upper limit thereof is desirably set to about 80%. If the porosity is less than about 20%, the honeycomb structural body 10 is more likely to have clogging. If the porosity exceeds about 80%, the honeycomb structural body 10 may have a poor strength and may be easily broken.

Incidentally, the above-mentioned porosity can be measured by known methods, such as a mercury intrusion method, Archimedes method and a measurement by a scanning electron microscope (SEM).

The lower limit of the average pore diameter of the honeycomb structural body 10 is desirably set to about 1 μm, and the upper limit thereof is desirably set to about 100 μm. If the average pore diameter is less than about 1 μm, clogging with particulates may easily occur. On the other hand, if the average pore diameter exceeds about 100 μm, particulates pass through the pores and cannot be collected, making the structural body unable to function as a filter.

Figure 5:
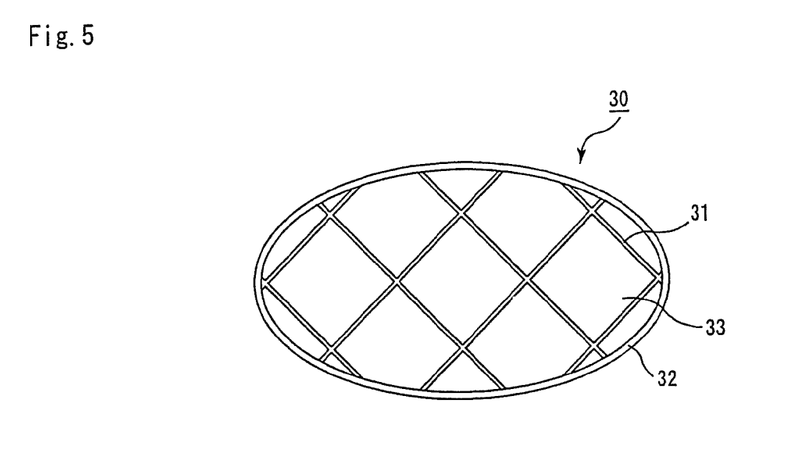
FIG. 5 is a cross-sectional view that schematically shows a cross section perpendicular to the longitudinal direction of another example of the honeycomb structural body of the present invention.
Figure 6:
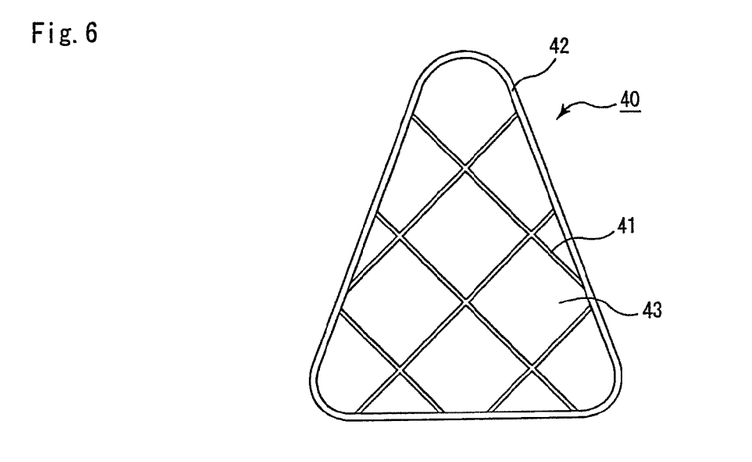
FIG. 6 is a cross-sectional view that schematically shows a cross section perpendicular to the longitudinal direction of still another example of the honeycomb structural body of the present invention.
Figure 7:
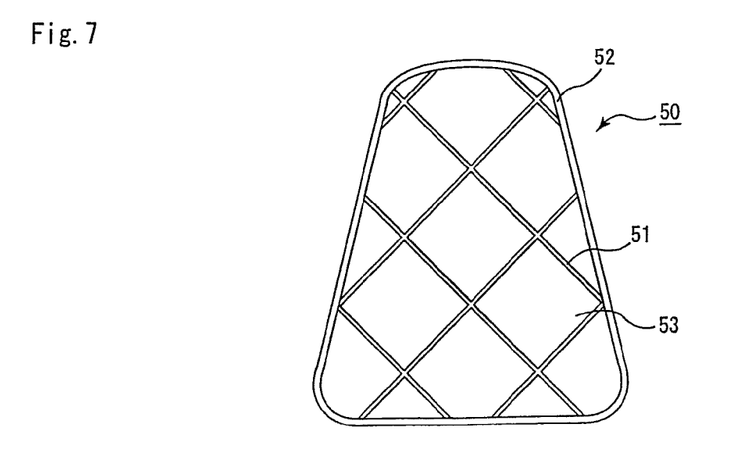
FIG. 7 is a cross-sectional view that schematically shows a cross section perpendicular to the longitudinal direction of still another example of the honeycomb structural body of the present invention.

The honeycomb structural body 10 shown in FIGS. 3A and 3B has an elongated round shape (race-track shape). However, the shape of the honeycomb structural body of the present invention is not particularly limited as long as it has a flat shape, and, for example, an elliptical shape on the cross section perpendicular to the longitudinal direction as shown in FIG. 5 or the like is proposed. Those shapes as shown in FIGS. 6 and 7 may also be used. In FIGS. 5 to 7, reference numerals 31, 41 and 51 represent inner sealing material layer, reference numerals 32, 42 and 52 represent peripheral sealing material layer, and reference numerals 33, 43 and 53 represent honeycomb units.

Moreover, in the honeycomb structural body of the present invention, the through holes may be constituted by two types of through holes, that is, a group of inlet-side through holes with ends on the outlet side being sealed with plugs so that the total sum of areas on cross sections perpendicular to the longitudinal direction is made relatively greater and a group of outlet-side through holes with ends on the inlet side being sealed with the plugs so that the total sum of areas on the cross sections thereof is made relatively smaller, with respect to the entire end face of the honeycomb structural body.

With respect to the combination between the above-mentioned group of inlet-side through holes and group of outlet-side through holes, the following combinations are listed: (1) a case where, with respect to each of through holes constituting the inlet-side through holes and each of through holes constituting the outlet-side through holes, the areas of cross sections perpendicular to the longitudinal direction are the same, while the number of the through holes constituting the group of inlet-side through holes is greater; (2) a case where, with respect to each of through holes constituting the inlet-side through holes and each of through holes constituting the outlet-side through holes, the areas of cross sections thereof are different from each other, with the numbers of the respective through holes also being different from each other; and (3) a case where, with respect to each of through holes constituting the inlet-side through holes and each of through holes constituting the outlet-side through holes, the area of the cross section of the through holes constituting the group of inlet-side through holes is greater, with the numbers of the through holes of the two groups being the same.

Moreover, the through holes constituting the group of inlet-side through holes and/or the through holes constituting the outlet-side through holes may be constituted by one type of through holes having the same shape and the same area on the cross section perpendicular to the longitudinal direction, or may be constituted by two or more types of through holes having different shapes and areas on the cross section perpendicular to the longitudinal direction.

A catalyst, which can convert CO, HC, NOx and the like contained in exhaust gases, may be supported on the honeycomb structural body 10.

The honeycomb structural body 10 in which the catalyst is supported functions as a filter capable of collecting particulates in exhaust gases, and also functions as a catalyst converter for converting CO, HC, NOx and the like contained in exhaust gases.

With respect to the catalyst to be supported on the honeycomb structural body 10, examples thereof are not particularly limited as long as it can convert CO, HC, NOx and the like in exhaust gases, and may include noble metals, such as platinum, palladium, and rhodium, and the like. Among these, a so-called three-way catalyst, comprising platinum, palladium and rhodium, is desirably used. Moreover, in addition to the noble metal, an alkali metal (Group 1 in Element Periodic Table), an alkali earth metal (Group 2 in Element Periodic Table), a rare-earth element (Group 3 in Element Periodic Table), a transition metal element and the like may be supported thereon as a co-catalyst.

The above-mentioned catalyst may be supported on the surface of each of pores of the honeycomb structural body 10, or may be supported on the surface of the partition wall 23 with a certain thickness. Moreover, the above-mentioned catalyst may be supported on the surface of the partition wall and/or the surface of each of pores evenly, or may be unevenly supported on a certain fixed place. Among these, the catalyst is desirably supported on the surface of the partition wall 23 or the surface of each of pores in the vicinity of the surface of the partition wall 23 in the through holes 21 that constitute the group of inlet-side through holes, and is more desirably supported on both of these surfaces. This arrangement makes the catalyst and particulates contact easily with each other, thereby making it possible to burn the particulates effectively.

Moreover, upon applying the catalyst to the honeycomb structural body 10, it is desirable to apply the catalyst after coating the surface of the honeycomb structural body with a support member such as alumina. With this arrangement, the specific surface area is made greater, the degree of dispersion of the catalyst is improved and the reaction sites of the catalyst are increased. Further, since it is possible to prevent sintering of the catalyst metal by the support member, the heat resistance of the catalyst is also improved. In addition, it becomes possible to reduce the pressure loss.

The honeycomb structural body of the present invention is allowed to function as a gas purifying device in the same manner as conventionally known DPFs (Diesel Particulate Filters) with a catalyst. Therefore, with respect to the case where the integral honeycomb structural body of the present invention is used as a catalyst supporting member, detailed description is omitted.

The following description will discuss one example of a manufacturing method for the above-mentioned honeycomb structural body of the present invention.

First, an extrusion-molding process is carried out by using the material paste mainly comprising the above-mentioned ceramics, and a ceramic molded body having a quadrangular pillar-shape is manufactured.

The above material paste is not particularly limited, but those which provide a honeycomb structural body having a porosity of about 20% to 80% after the manufacturing process are desirably employed. For example, a material paste, prepared by adding a binder, a dispersant solution and the like to powders comprising the above-mentioned ceramics, may be used.

With respect to the ceramic powder, examples thereof are not particularly limited, and may include powder of: oxide ceramics such as cordierite, alumina, silica, and mullite; carbide ceramics such as silicon carbide, zirconium carbide, titanium carbide, tantalum carbide, and tungsten carbide; nitride ceramics such as aluminum nitride, silicon nitride, boron nitride, and titanium nitride; and a composite material of silicon carbide and silicon. Among these, silicon carbide, which have a high heat resistance, excellent mechanical properties and a high thermal conductivity, are more preferably used.

With respect to the particle size of ceramic powder, although not particularly limited, materials which show a little shrinkage in the succeeding firing process are desirably used. For example, mixed powders, prepared by combining 100 parts by weight of powder having an average particle size of about 0.3 to 50 μm with about 5 to 65 parts by weight of powder having an average particle size of about 0.1 to 1.0 μm, are preferably used.

With respect to the above-mentioned binder, although not particularly limited, examples thereof include methyl cellulose, carboxymethyl cellulose, hydroxyethyl cellulose, polyethylene glycol, phenol resins, epoxy resins and the like.

Normally, the blending amount of the above-mentioned binder is desirably set to about 1 to 10 parts by weight to 100 parts by weight of ceramic powder.

With respect to the above-mentioned dispersant solution, although not particularly limited, examples thereof include an organic solvent such as benzene, alcohol such as methanol, water and the like.

An appropriate amount of the above-mentioned dispersant solution is blended so that the viscosity of the material paste is set in a predetermined range.

These ceramic powder, binder and dispersant solution are mixed by an attritor or the like, and sufficiently kneaded by a kneader or the like, and then extrusion-molded.

Moreover, a molding auxiliary may be added to the above-mentioned material paste, if necessary.

With respect to the molding auxiliary, although not particularly limited, examples thereof include ethylene glycol, dextrin, fatty acid soap, polyalcohol and the like.

Furthermore, a pore-forming agent, such as balloons that are fine hollow spheres comprising oxide-based ceramics, spherical acrylic particles, and graphite, may be added to the above-mentioned material paste, if necessary.

With respect to the above-mentioned balloons, examples thereof are not particularly limited, and may include alumina balloons, glass micro-balloons, shirasu balloons, fly ash balloons (FA balloons), mullite balloons and the like. Among these, alumina balloons are more desirably used.

Next, the above-mentioned ceramic molded body is dried by using a dryer, such as a microwave dryer, a hot-air dryer, a dielectric dryer, a decompression dryer, a vacuum dryer, and a freeze dryer, to form a ceramic dried body. Next, a predetermined amount of sealing material (plug) paste, which forms plugs, is injected into ends on the outlet side of the group of the inlet-side through holes and ends on the inlet side of the group of the outlet-side through holes so as to seal the through holes.

With respect to the above-mentioned sealing material (plug) paste, although not particularly limited, those which provide a plug manufactured through post-processes with a porosity of about 20% to 80% are desirably employed. The paste same as the above-mentioned material paste may for example be used. However, a paste, prepared by adding ceramic fibers, powder comprising the above-mentioned metal, a lubricant, a solvent, a dispersant, a binder and the like to ceramic powder used in the above-mentioned material paste, is more desirably used. With this arrangement, it becomes possible to adjust the thermal capacity of the plug manufactured through post processes, and also to prevent ceramic particles and the like in the sealing material (plug) paste from settling in the middle of the sealing process.

With respect to the above-mentioned ceramic fiber, although not particularly limited, examples thereof include a ceramic fiber comprising one of silica-alumina, mullite, alumina, silica and the like. Each of these may be used alone, or two or more of these may be used in combination.

Next, the ceramic dried body filled with the sealing material (plug) paste is subjected to degreasing and firing processes under predetermined conditions so that a honeycomb unit 20, which comprises porous ceramics and is constituted by a single sintered body as a whole, is manufactured.

With respect to the degreasing and firing conditions and the like of the ceramic dried body, it is possible to apply conditions that have been conventionally used for manufacturing a filter comprising porous ceramics.

The honeycomb unit 20 desirably comprises ceramic crystals having the average particle size with a lower limit value of about 2 μm and an upper limit value of about 150 μm. It is more desirable that the lower limit value is about 10 μm and the upper limit value is about 70 μm. If the average particle size of the ceramic crystals is less than about 2 μm, the pore diameter of pores existing inside the honeycomb unit becomes too small to cause clogging, failing to function as a filter. On the other hand, the average particle size of the ceramic crystals exceeding about 150 μm makes the pore diameter of the pores existing therein too large, and may reduce the strength of the honeycomb unit. Moreover, manufacturing such a honeycomb unit that has ceramic crystals having open pores at a predetermined rate and an average particle size exceeding about 150 μm itself is not easy. Here, the average pore diameter of this honeycomb unit is desirably set in the range of about 1 to 40 μm.

In the case where a catalyst is supported on the honeycomb unit, it is desirable that an alumina film having a high specific surface area is formed on the surface of the ceramic fired body obtained through the firing process, and a co-catalyst and a catalyst such as platinum are applied onto the surface of the alumina film.

With respect to the method for forming the alumina film on the surface of the ceramic fired body, a method in which the ceramic fired body is impregnated with a solution of a metal compound containing aluminum such as $Al(NO_3)_3$ and then heated, and a method in which the ceramic fired body is impregnated with a solution containing alumina powder and then heated, and other methods may be used.

With respect to the method for applying a co-catalyst to the alumina film, for example, a method in which the ceramic fired body is impregnated with a solution of a metal compound containing a rare-earth element and the like, such as $Ce(NO_3)_3$, and then heated, and other methods may be used.

With respect to the method for applying a catalyst to the alumina film, for example, a method in which the ceramic fired body is impregnated with a solution of diammine dinitro platinum nitric acid solution ($[Pt(NH_3)_2(NO_2)_2]HNO_3$ with a platinum concentration of 4.53% by weight) and then heated may be used.

Moreover, in the honeycomb structural body of the present invention, a sealing material paste to form a sealing material layer (adhesive layer) 11 is applied to the side face of the honeycomb structural body 20 with a uniform thickness to form a sealing material paste layer, and another honeycomb structural body 20 is serially laminated thereon. By successively repeating these processes, a honeycomb unit aggregated body having a predetermined size is manufactured.

Here, with respect to the material constituting the sealing material paste, since the explanation thereof has already been given, the detailed description thereof is omitted.

Next, this honeycomb unit aggregated body is heated so that the sealing material paste layer is dried and solidified to form the sealing material layer (adhesive layer) 11.

Next, the honeycomb unit aggregated body, constituted by a plurality of the honeycomb units 20 bonded to one another through the sealing material layer (adhesive layer) 11, is subjected to a cutting process by using a diamond cutter or the like so that the pattern of the sealing material layer (adhesive layer) 11 among the honeycomb units 20 on a cross section perpendicular to the longitudinal direction is aligned in a diagonal direction with respect to the major axis of a shape that forms the contour of the cross section; thus, a ceramic block 15 having a flat shape is manufactured.

Then, a sealing material layer (coat layer) 12 is formed on the periphery of each ceramic block 15 by using the sealing material paste so that a honeycomb structural body 10 comprising: a ceramic block 15 having a flat shape in which a plurality of honeycomb units 20 are bonded to each other through a sealing material layer (adhesive layer) 11; and a sealing material layer (coat layer) 12 formed on a peripheral portion thereof, is manufactured.

According to the manufacturing method for a honeycomb structural body of the present invention, the cutting process and the like can be performed promptly and manufacture of the honeycomb structural body can be performed efficiently since a cutting process is carried out so that the pattern of the sealing material layer (adhesive layer) among the honeycomb units on a cross section perpendicular to the longitudinal direction is aligned in a diagonal direction with respect to the major axis of a shape that forms the contour of the cross section and a ceramic block having a flat shape is prepared.

Although not particularly limited, the honeycomb structural body of the present invention is desirably applied to an exhaust gas purifying device for use in vehicles.

Figure 8:
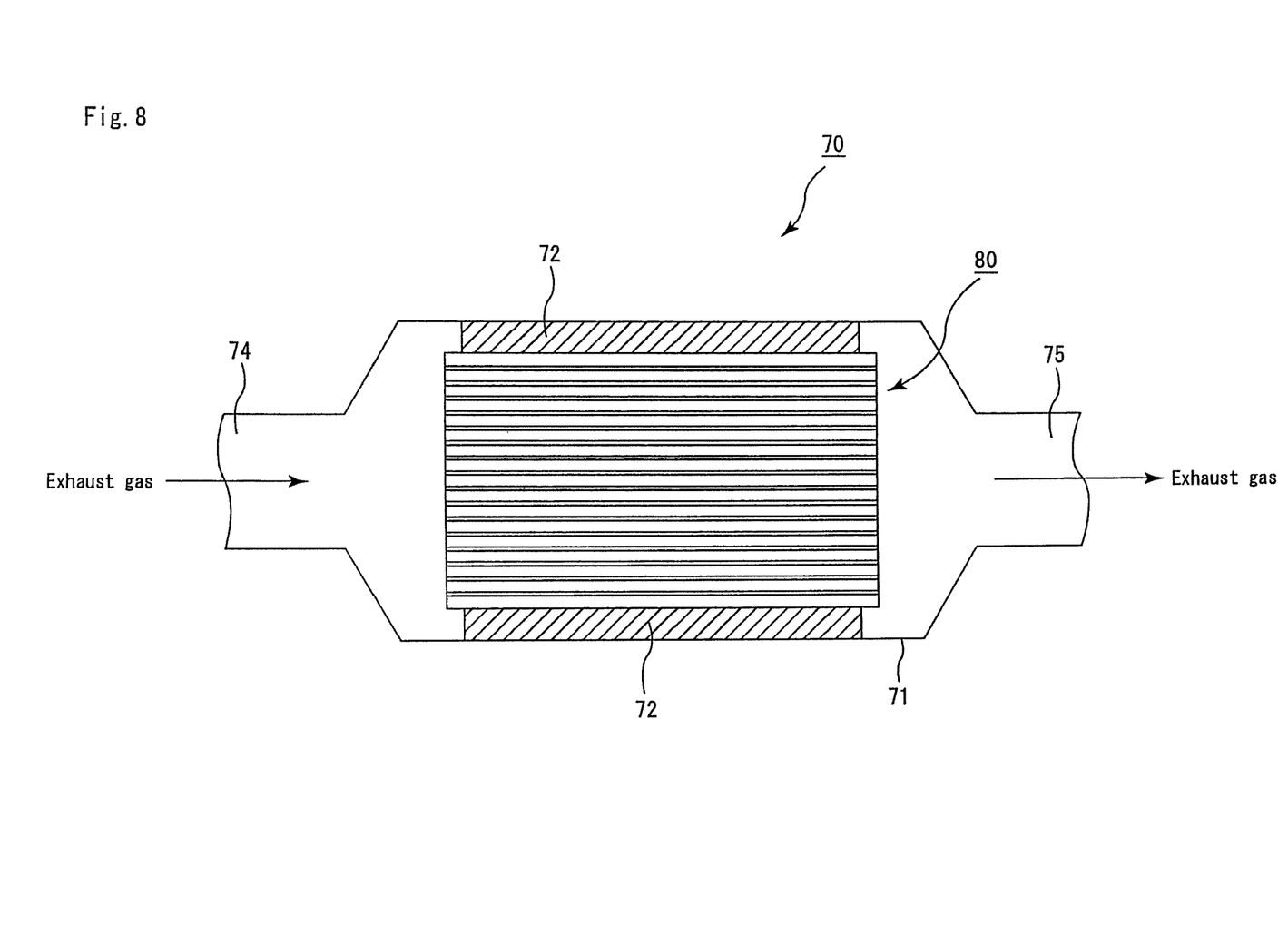
FIG. 8 is a cross-sectional view that schematically shows one example of an exhaust gas purifying device for a vehicle in which the honeycomb structural body of the present invention is installed.

FIG. 8 is a cross-sectional view that schematically shows one example of an exhaust gas purifying device of a vehicle in which the honeycomb structural body of the present invention is installed.

As shown in FIG. 8, an exhaust gas purifying device 70 is mainly constituted by a honeycomb structural body 80, a casing 71 that covers the external portion of the honeycomb structural body 80, and a holding sealing material 72 that is placed among the honeycomb structural body 80 and the casing 71. Further, an introducing pipe 74, which is connected to an internal combustion system such as an engine, is joined to one end of the casing 71 on the exhaust gas inlet side, and an exhaust pipe 75 connected to outside is joined to the other end of the casing 71. In FIG. 8, arrows indicate flows of exhaust gases.

Moreover, in FIG. 8, the honeycomb structural body 80 may be prepared as the honeycomb structural body 10 shown in FIGS. 3A and 3B, or as the honeycomb structural body 30, 40 or 50, shown in FIGS. 5 to 7. Here, the casing needs to have a shape that fits each of the structural bodies.

In the exhaust gas purifying device 70 having the above-mentioned constitution, exhaust gases, discharged from the internal combustion system such as an engine, are introduced into the casing 71 via the introducing pipe 74, and flow into the honeycomb structural body from the inlet-side through holes and pass through the partition wall. Thus, the exhaust gases are purified, with particulates thereof being collected in the partition wall, then are discharged outside the honeycomb structural body from the outlet-side through holes, and are discharged outside through the exhaust pipe 75.

With respect to the exhaust gas purifying device 70, after a large quantity of particulates have been accumulated on the partition wall of the honeycomb structural body to cause an increase in pressure loss, the honeycomb structural body is subjected to a regenerating process.

In the regenerating process, gases, heated by using a heating means (not shown), are allowed to flow into the through holes of the honeycomb structural body so that the honeycomb structural body is heated to burn and eliminate the particulates accumulated on the partition wall. Here, the particulates may be burned and eliminated by using a post-injection system.

EXAMPLES

The following description will discuss the present invention in detail by means of examples. However, the present invention is not limited to these examples.

Example 1

Powder of α-type silicon carbide having an average particle size of 10 μm (60% by weight) and powder of a-type silicon carbide having an average particle size of 0.5 μm (40% by weight) were wet-mixed. To 100 parts by weight of the resulting mixture were added and kneaded 5 parts by weight of an organic binder (methyl cellulose) and 10 parts by weight of water to prepare a mixed composition. Next, after a slight amount of a plasticizer and a lubricant had been added therein and further kneaded, the resulting mixture was extrusion-molded so that a raw molded product having a cross-sectional shape that was approximately the same as that shown in FIG. 4A was produced.

Next, after the above-mentioned raw molded product was dried by using a microwave drier or the like to form a ceramic dried body, predetermined through holes were filled with a sealing material (plug) paste having the same composition as the raw molded product so as to have a thickness of 1.0 mm in the dried state.

After dried again by using a drier, the resulting product was degreased at 400° C., and fired at 2200° C. in a normal-pressure argon atmosphere for 3 hours to manufacture a honeycomb unit 20, which comprised a silicon carbide sintered body and had a porosity of 42%, an average pore diameter of 9 μm, a size of 34.3 mm×34.3 mm×150 mm, the number of through holes 21 of 28 pcs/cm² and a thickness of the partition wall 23 of 0.40 mm. Table 1 shows the cross-sectional area of the honeycomb unit. As shown in Table 1, the cross-sectional area of the honeycomb unit was 11.8 cm².

Thereafter, as shown in FIG. 4A, in the honeycomb unit 20, through holes were sealed with the plugs so as to form a checked pattern. In other words, when one of the end faces is sealed with the plugs so as to have a pattern as shown in FIG. 4A, the other end face is sealed with the plugs in a reversed pattern.

Next, by using a heat-resistant sealing material paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, a large number of the honeycomb units 20 were combined with one another, and this was then cut with a diamond cutter to form a pattern as shown in FIGS. 3A and 3B, so that a ceramic block 15 having an elongated round shape in the contour of each end face was manufactured.

At this time, the thickness of the sealing material layer (adhesive layer) 11 used for bonding the honeycomb structural body 10 was adjusted to be 1.0 mm.

Next, ceramic fibers comprising 23.3% by weight of alumina silicate (shot content: 3%, fiber length: 0.1 to 100 μm) which served as inorganic fibers, 30.2% by weight of silicon carbide powder having an average particle size of 0.3 μm which served as inorganic particles, 7% by weight of silica sol (SiO₂ content in the sol: 30% by weight) which served as an inorganic binder, 0.5% by weight of carboxymethyl cellulose which served as an organic binder, and 39% by weight of water were mixed and kneaded to prepare a sealing material paste.

Next, a sealing material paste layer was formed on the peripheral face of the ceramic block 15 by using the above-mentioned sealing material paste. Then, this sealing material paste layer was dried at 120° C. to form a sealing material layer (coat layer) 12, so that a honeycomb structural body 10, which had an elongated round shape in the contour of each end face with the major axis of 200 mm long and the minor axis of 100 mm long and had the sealing material layer with a thickness of 0.2 mm, was manufactured. Incidentally, the cross-sectional area of the cross section perpendicular to the longitudinal direction of the honeycomb structural body was 179 cm², and on this cross section, the pattern of the sealing material layer among the honeycomb units and the major axis in the shape forming the contour of the cross section were allowed to make an angle of 5°. The maximum cross-sectional area of this honeycomb unit was 11.8 cm².

Examples 2 to 7 and Comparative Examples 1 to 3

The same processes as those of Example 1 were carried out to prepare each honeycomb structural body 10 except that the angle that was formed by the pattern of the sealing material layer among honeycomb units on a cross section perpendicular to the longitudinal direction and the major axis in the shape forming the contour of the cross section, and that the maximum cross-sectional area perpendicular to the longitudinal direction of the honeycomb unit were respectively set to values listed on Table 1.

Example 8

The same processes as those of Example 1 except the following were carried out to prepare each honeycomb structural body 10: the angle that was formed by the pattern of the sealing material layer among honeycomb units on a cross section perpendicular to the longitudinal direction and the major axis in the shape forming the contour of the cross section, and the maximum cross-sectional area perpendicular to the longitudinal direction of the honeycomb unit were respectively set to the values listed on Table 1; the ceramic block was manufactured by using a heat resistant sealing material (adhesive) paste containing alumina fibers having a fiber length of 20 μm (30% by weight), silicon carbide particles having an average particle size of 0.6 μm (21% by weight), silica sol (15% by weight), carboxymethyl cellulose (5.6% by weight) and water (28.4% by weight) as the sealing material (adhesive) paste for bonding the honeycomb units 20; and the sealing material layer was formed on the peripheral portion of the ceramic block 15 by using a peripheral portion sealing material paste containing ceramic fibers comprising alumina silicate (shot content: 3%, fiber length: 5 to 100 μm) (23.3% by weight), silicon carbide powder having an average particle size of 0.3 μm (30.2% by weight), silica sol (SiO₂ content in the sol: 30% by weight) (7% by weight), carboxymethyl cellulose (0.5% by weight) and water (39% by weight).

Examples 9 to 15 and Comparative Examples 4 to 6

The same processes as those of Example 1 were carried out to prepare each honeycomb structural body 30 except that: the contour of the end face was formed into an elliptical shape as shown in FIG. 5; and the angle that was formed by the pattern of the sealing material layer among honeycomb units on a cross section perpendicular to the longitudinal direction and the major axis in the shape forming the contour of the cross section, and the maximum cross-sectional area perpendicular to the longitudinal direction of the honeycomb unit were respectively set to values listed on Table 1.

Example 16

The same processes as those of Example 9 except the following were carried out to prepare each honeycomb structural body 10: the angle that was formed by the pattern of the sealing material layer among honeycomb units on a cross section perpendicular to the longitudinal direction and the major axis in the shape forming the contour of the cross section, and the maximum cross-sectional area perpendicular to the longitudinal direction of the honeycomb unit were respectively set to the values listed on Table 1; the ceramic block was manufactured by using a heat resistant sealing material (adhesive) paste containing alumina fibers having a fiber length of 20 μm (30% by weight), silicon carbide particles having an average particle size of 0.6 μm (21% by weight), silica sol (15% by weight), carboxymethyl cellulose (5.6% by weight) and water (28.4% by weight) as the sealing material (adhesive) paste for bonding the honeycomb units 20; and the sealing material layer was formed on the peripheral portion of the ceramic block 15 by using a peripheral portion sealing material paste containing ceramic fibers comprising alumina silicate (shot content: 3%, fiber length: 5 to 100 μm) (23.3% by weight), silicon carbide powder having an average particle size of 0.3 μm (30.2% by weight), silica sol (SiO₂ content in the sol: 30% by weight) (7% by weight), carboxymethyl cellulose (0.5% by weight) and water (39% by weight).

Examples 17 to 23 and Comparative Examples 7 to 9

The same processes as those of Example 1 were carried out to prepare each honeycomb structural body 50 except that: the contour of the end face was formed into an approximately triangular shape as shown in FIG. 6; and the angle that was formed by the pattern of the sealing material layer among honeycomb units on a cross section perpendicular to the longitudinal direction and the major axis in the shape forming the contour of the cross section, and the maximum cross-sectional area perpendicular to the longitudinal direction of the honeycomb unit were respectively set to the values listed on Table 1.

Example 24

The same processes as those of Example 17 except the following were carried out to prepare each honeycomb structural body 10: the angle that was formed by the pattern of the sealing material layer among honeycomb units on a cross section perpendicular to the longitudinal direction and the major axis in the shape forming the contour of the cross section, and the maximum cross-sectional area perpendicular to the longitudinal direction of the honeycomb unit were respectively set to the values listed on Table 1; the ceramic block was manufactured by using a heat resistant sealing material (adhesive) paste containing alumina fibers having a fiber length of 20 μm (30% by weight), silicon carbide particles having an average particle size of 0.6 μm (21% by weight), silica sol (15% by weight), carboxymethyl cellulose (5.6% by weight) and water (28.4% by weight) as the sealing material (adhesive) paste for bonding the honeycomb units 20; and the sealing material layer was formed on the peripheral portion of the ceramic block 15 by using a peripheral portion sealing material paste containing ceramic fibers comprising alumina silicate (shot content: 3%, fiber length: 5 to 100 μm) (23.3% by weight), silicon carbide powder having an average particle size of 0.3 μm (30.2% by weight), silica sol ($SiO_2$ content in the sol: 30% by weight) (7% by weight), carboxymethyl cellulose (0.5% by weight) and water (39% by weight).

Reference Examples 1 and 2

The same processes as those of Example 1 were carried out to prepare each honeycomb structural body 10 except that the maximum cross-sectional area perpendicular to the longitudinal direction of the honeycomb unit was changed into each of values shown in Table 1. Incidentally, with respect to the dimension of the cross section perpendicular to the longitudinal direction of the honeycomb unit, it was set to 5.2 cm×5.2 cm in Reference Example 1, and to 6.3 cm×6.3 cm in Reference Example 2.

(Evaluation)
(1) Thermal Impact Test (Peripheral Portion of the Sealing Material Layer)

The honeycomb structural body according to each of the Examples and Comparative Examples was put into an electric furnace, and subjected to a thermal impact test with various temperature-rising rates, in which after having been maintained at 700° C. for 30 minutes, it was gradually cooled to room temperature (20° C.).

With respect to the above thermal impact test, test conditions that cause cracks in the sealing material layer (peripheral portion) of the honeycomb structural body were found out by changing temperature-rising rates. The lowest temperature-rising rate in such test conditions was defined as the thermal impact-resistance limit temperature rising rate of the honeycomb structural body. The test results of the respective honeycomb structural bodies according to the Examples and Comparative Examples are shown in Table 1.

(2) Thermal Impact Test (Sealing Material Layer Joining Portion)

The honeycomb structural body according to each of the Examples and Comparative Examples was put into an electric furnace, and subjected to a thermal impact test with different temperature-rising rates (10° C./min, 20° C./min) in which after having been maintained at 700° C. for 30 minutes, it was gradually cooled to room temperature (20° C.).

After the thermal impact test, each of the honeycomb structural bodies was put into a hollow cylindrical jig. Then, one of the honeycomb filters, located approximately in the center of the honeycomb structural body, was selected, and a pressure was applied to the honeycomb filter in a pushing-out direction by the cylindrical jig made of stainless having a diameter of 31 mm so that the breaking load (bonding strength) was measured, and based upon the results, the pushing-out load (breaking load) of the sealing material layer joining portion that had received a thermal impact was defined.

The results of the tests on the honeycomb structural bodies according to the Examples and Comparative Examples at this time are shown in Table 1.

(3) Machining Resistance to Machining Process

A cam-grinding machine (N34) manufactured by Okuma Corporation was used as the machining device. A grindstone SD200N75MF04 and the honeycomb structural body were rotated with the rotational speed of the grindstone rotation was fixed to 60 m/sec in the circumferential speed, and the number of rotation of the honeycomb structural body being set to 20 rpm, and a cutting process was carried out in the longitudinal direction with the speed (traverse machining speed) in the longitudinal direction being changed. The maximum machining speed was measured while it was observed whether or not any cracks and the like would occur.

Table 1 shows the measured results of the speed at which cracks occurred in the honeycomb structural body according to each of the Examples and Comparative Examples.

TABLE 1

| | Cross-sectional shape of honeycomb structural body | Maximum cross-sectional area (cm$^2$) | Angle (°) | Thermal impact-resistance limit temperature-rising rate (° C./min) | Pushing-out load (kg) (After thermal treatment of 10° C./min) | Pushing-out load (kg) (After thermal treatment of 20° C./min) | Limit processing rate (mm/min) |
|---|---|---|---|---|---|---|---|
| Example 1 | FIG. 3 (Elongated round shape) | 11.8 | 5 | 10 | 1500 | 1000 | 200 |
| Example 2 | FIG. 3 (Elongated round shape) | 11.8 | 15 | 15 | 1600 | 1400 | 230 |
| Example 3 | FIG. 3 (Elongated round shape) | 11.8 | 30 | 18 | 1650 | 1450 | 240 |

TABLE 1-continued

| | Cross-sectional shape of honeycomb structural body | Maximum cross-sectional area (cm²) | Angle (°) | Thermal impact-resistance limit temperature-rising rate (° C./min) | Pushing-out load (kg) (After thermal treatment of 10° C./min) | Pushing-out load (kg) (After thermal treatment of 20° C./min) | Limit processing rate (mm/min) |
|---|---|---|---|---|---|---|---|
| Example 4 | FIG. 3 (Elongated round shape) | 11.8 | 45 | 20 | 1700 | 1500 | 250 |
| Example 5 | FIG. 3 (Elongated round shape) | 11.8 | 60 | 18 | 1650 | 1450 | 240 |
| Example 6 | FIG. 3 (Elongated round shape) | 11.8 | 75 | 15 | 1600 | 1400 | 230 |
| Example 7 | FIG. 3 (Elongated round shape) | 11.8 | 85 | 10 | 1500 | 1000 | 200 |
| Example 8 | FIG. 3 (Elongated round shape) | 11.8 | 45 | 20 | 1700 | 1500 | 250 |
| Compar. Ex. 1 | FIG. 3 (Elongated round shape) | 11.8 | 0 | 5 | 900 | 500 | 185 |
| Compar. Ex. 2 | FIG. 3 (Elongated round shape) | 11.8 | 3 | 7 | 1000 | 600 | 180 |
| Compar. Ex. 3 | FIG. 3 (Elongated round shape) | 11.8 | 88 | 7 | 1000 | 600 | 185 |
| Example 9 | FIG. 5 (Elliptical shape) | 11.8 | 5 | 10 | 1500 | 1000 | 200 |
| Example 10 | FIG. 5 (Elliptical shape) | 11.8 | 15 | 15 | 1600 | 1400 | 230 |
| Example 11 | FIG. 5 (Elliptical shape) | 11.8 | 30 | 18 | 1650 | 1450 | 240 |
| Example 12 | FIG. 5 (Elliptical shape) | 11.8 | 45 | 20 | 1700 | 1500 | 250 |
| Example 13 | FIG. 5 (Elliptical shape) | 11.8 | 60 | 18 | 1650 | 1450 | 240 |
| Example 14 | FIG. 5 (Elliptical shape) | 11.8 | 75 | 15 | 1600 | 1400 | 230 |
| Example 15 | FIG. 5 (Elliptical shape) | 11.8 | 85 | 10 | 1500 | 1000 | 200 |
| Example 16 | FIG. 5 (Elliptical shape) | 11.8 | 45 | 20 | 1700 | 1500 | 250 |
| Compar. Ex. 4 | FIG. 5 (Elliptical shape) | 11.8 | 0 | 5 | 900 | 500 | 185 |
| Compar. Ex. 5 | FIG. 5 (Elliptical shape) | 11.8 | 3 | 7 | 1000 | 600 | 180 |
| Compar. Ex. 6 | FIG. 5 (Elliptical shape) | 11.8 | 88 | 7 | 1000 | 600 | 185 |
| Example 17 | FIG. 6 (Approximately triangular shape) | 11.8 | 5 | 10 | 1500 | 1000 | 200 |
| Example 18 | FIG. 6 (Approximately triangular shape) | 11.8 | 15 | 15 | 1600 | 1400 | 230 |
| Example 19 | FIG. 6 (Approximately triangular shape) | 11.8 | 30 | 18 | 1650 | 1450 | 240 |
| Example 20 | FIG. 6 (Approximately triangular shape) | 11.8 | 45 | 20 | 1700 | 1500 | 250 |
| Example 21 | FIG. 6 (Approximately triangular shape) | 11.8 | 60 | 18 | 1650 | 1450 | 240 |
| Example 22 | FIG. 6 (Approximately triangular shape) | 11.8 | 75 | 15 | 1600 | 1400 | 230 |
| Example 23 | FIG. 6 (Approximately triangular shape) | 11.8 | 85 | 10 | 1500 | 1000 | 200 |
| Example 24 | FIG. 6 (Approximately triangular shape) | 11.8 | 45 | 20 | 1700 | 1500 | 250 |
| Compar. Ex. 7 | FIG. 6 (Approximately triangular shape) | 11.8 | 0 | 5 | 900 | 500 | 185 |
| Compar. Ex. 8 | FIG. 6 (Approximately triangular shape) | 11.8 | 3 | 7 | 1000 | 600 | 180 |
| Compar. Ex. 9 | FIG. 6 (Approximately triangular shape) | 11.8 | 88 | 7 | 1000 | 600 | 185 |
| Ref. Ex. 1 | FIG. 3 (Elongated round shape) | 27.0 | 45 | 11 | 1550 | 1050 | 245 |
| Ref. Ex. 2 | FIG. 3 (Elongated round shape) | 40.0 | 45 | 10 | 1500 | 1000 | 240 |

As shown in Table 1, the honeycomb structural bodies according to the Examples, in which the pattern of the sealing material layer among the honeycomb units on a cross section perpendicular to the longitudinal direction is formed in a diagonal direction with respect to the major axis of a shape that forms the contour of the cross section, have superior thermal impact resistance and machining resistance with respect to the peripheral sealing material and the sealing material serving as the adhesive material. In contrast, the honeycomb structural bodies according to the Comparative Examples, in which the pattern of the sealing material layer among the honeycomb units on a cross section perpendicular to the longitudinal direction is formed in approximately a perpendicular direction with respect to the major axis of a shape that forms the contour of the cross section, are inferior to the honeycomb structural bodies according to the Examples in the thermal impact resistance and machining resistance with respect to both of the peripheral sealing material and the sealing material serving as the adhesive material. Moreover, the honeycomb structural bodies according to the Reference Examples, in which the cross-sectional area of the honeycomb unit is set to 25 cm$^2$ or more, is slightly inferior to the honeycomb structural bodies according to the Examples in the thermal impact resistance.

What is claimed is:

1. A honeycomb structural body, comprising:
   a ceramic block having a flat shape and comprising a plurality of honeycomb units;
   a sealing material layer bonding the honeycomb units and comprising a sealing material paste; and
   a peripheral sealing material layer formed on a peripheral portion of the ceramic block,
   wherein the flat shape has a cross-section which is bisected by an axis, the sealing material layer forms an angle diagonal with respect to the axis of the flat shape, the sealing material layer has a plurality of end portions abutting against the peripheral sealing layer at a diagonal angle, and each of the honeycomb units has a plurality of through holes extending in a longitudinal direction of the ceramic block and a partition wall portion between the through holes.

2. The honeycomb structural body according to claim 1, wherein each of the honeycomb units has a cross-sectional area of about 25 cm$^2$ or less in a direction perpendicular to the longitudinal direction.

3. The honeycomb structural body according to claim 2, wherein each of the honeycomb units has a cross-sectional area of about 1 cm$^2$ or more in the direction perpendicular to the longitudinal direction.

4. The honeycomb structural body according to claim 1, wherein the flat shape is one of a race-track shape and an elliptical shape on the cross section perpendicular to the longitudinal direction.

5. The honeycomb structural body according to claim 1, wherein the angle is at least about 5° and at most about 85°.

6. The honeycomb structural body according to claim 1, wherein the angle is in the range of about 15° to 75°.

7. The honeycomb structural body according to claim 1, wherein the angle is in the range of about 30° to 60°.

8. The honeycomb structural body according to claim 1, wherein the peripheral sealing material layer has a thickness of at least about 0.1 mm and at most about 10 mm.

9. The honeycomb structural body according to claim 8, wherein the peripheral sealing material layer has a thickness in the range of about 0.1 to 4 mm.

10. The honeycomb structural body according to claim 1, wherein the sealing material layer bonding the honeycomb units has a thickness of at least about 0.1 mm and at most about 10 mm.

11. The honeycomb structural body according to claim 10, wherein the sealing material layer bonding the honeycomb units has a thickness in the range of about 0.2 to 3 mm.

12. The honeycomb structural body according to claim 1, wherein the sealing material layer further comprises an inorganic binder, an organic binder and inorganic fibers.

13. The honeycomb structural body according to claim 1, wherein the plurality of honeycomb units is configured to filter particles in an exhaust gas.

14. The honeycomb structural body according to claim 13, wherein the sealing material layer and peripheral sealing material layer further comprise an inorganic binder, an organic binder and inorganic fibers.

15. The honeycomb structural body according to claim 1, wherein the plurality of through holes includes ones sealed on one of the end sides of the ceramic block and ones sealed on the other one of the end sides of the ceramic block.

16. A honeycomb structural body comprising:
   a ceramic block comprising a plurality of honeycomb units;
   a sealing material layer bonding the honeycomb units and comprising a sealing material paste; and
   a peripheral sealing material layer formed on a peripheral portion of the ceramic block,
   wherein the ceramic block has a shape which is formed by providing the honeycomb units and a quadrangular pillar-shape, bonding the honeycomb units with the sealing material layer, and cutting the honeycomb units bonded with the sealing material layer into the shape such that the sealing material layer forms an angle diagonal with respect to an axis bisecting a cross-section of the shape, the sealing material layer has a plurality of end portions abutting against the peripheral sealing layer at a diagonal angle, and each of the honeycomb units has a plurality of through holes extending in a longitudinal direction of the ceramic block and a partition wall portion between the through holes.

17. The honeycomb structural body according to claim 16, wherein the angle is at least about 5° and at most about 85°.

18. The honeycomb structural body according to claim 16, wherein the angle is in the range of about 30° to 60°.

19. The honeycomb structural body according to claim 16, wherein the cross-section of the shape is bisected by the axis alone.

20. A method for manufacturing a honeycomb structural body having a flat shape, comprising:
   providing a plurality of honeycomb units, each of the honeycomb units having a quadrangular pillar-shape, the honeycomb units having a plurality of through holes extending in parallel with one another in a longitudinal direction of the ceramic block and a partition wall interposed between the through holes;
   bonding the plurality of honeycomb units to each other with a sealing material layer;
   cutting the plurality of honeycomb units bonded with the sealing material layer into a ceramic block having a shape such that the sealing material layer forms an angle diagonal with respect to an axis of a cross-section of the shape; and
   forming a peripheral sealing layer on a peripheral portion of the ceramic block such that the sealing layer has a plurality of end portions abutting against the peripheral sealing layer at a diagonal angle.

21. The method for manufacturing a honeycomb structural body according to claim 20, wherein the angle is at least about 5° and at most about 85°.

22. The method for manufacturing a honeycomb structural body according to claim 20, wherein the angle is in the range of about 30° to 60°.

23. The method for manufacturing a honeycomb structural body according to claim 20, wherein the cross-section of the shape is bisected by the axis alone.

* * * * *